United States Patent
Lee

(10) Patent No.: US 9,733,029 B2
(45) Date of Patent: Aug. 15, 2017

(54) COOLING SYSTEM FOR VEHICLE AND CONTROLLING METHOD THEREOF

(71) Applicant: Hyundai Motor Company, Seoul (KR)

(72) Inventor: Jun Yong Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 337 days.

(21) Appl. No.: 14/555,178

(22) Filed: Nov. 26, 2014

(65) Prior Publication Data

US 2016/0084593 A1 Mar. 24, 2016

(30) Foreign Application Priority Data

Sep. 19, 2014 (KR) .......................... 10-2014-0124769

(51) Int. Cl.
| | |
|---|---|
| *G05D 23/00* | (2006.01) |
| *F28F 27/02* | (2006.01) |
| *F28F 1/00* | (2006.01) |
| *F01N 5/02* | (2006.01) |
| *F01P 7/00* | (2006.01) |
| *F02N 19/10* | (2010.01) |

(Continued)

(52) U.S. Cl.
CPC .............. *F28F 27/02* (2013.01); *B60H 1/03* (2013.01); *F01N 5/02* (2013.01); *F01P 7/00* (2013.01); *F02M 26/00* (2016.02); *F02N 19/10* (2013.01); *F28F 1/00* (2013.01); *F28F 2250/06* (2013.01); *Y02T 10/121* (2013.01); *Y02T 10/146* (2013.01); *Y02T 10/16* (2013.01)

(58) Field of Classification Search
CPC  F28F 27/02; F28F 1/00; Y02T 10/121; Y02T 10/146; Y02T 10/16

USPC .............. 165/287, 288, 294, 297, 41, 42, 44
See application file for complete search history.

(56) References Cited

U.S. PATENT DOCUMENTS

2010/0251703 A1* 10/2010 Takeishi .................... F01N 5/02
                                                                60/320
2012/0067545 A1*  3/2012 Yamazaki ................ F01M 5/00
                                                                165/52

(Continued)

FOREIGN PATENT DOCUMENTS

JP         2008-231942 A      10/2008
JP         2014-001646 A       1/2014

(Continued)

*Primary Examiner* — Justin Jonaitis
(74) *Attorney, Agent, or Firm* — Morgan Lewis & Bockius LLP

(57) ABSTRACT

A cooling system for a vehicle may include a cooling water temperature sensor, a cooling circulation fluid passage including first, second and third fluid passages, wherein the cooling water exhausted from the engine may be branched into the first fluid passage provided with a heater core, the second fluid passage provided with a radiator, and the third fluid passage provided with an exhaust heat recovery apparatus, a fluid flow adjusting valve provided on a point at which the cooling water passing through the cooling water temperature sensor may be branched into the first fluid passage to the third fluid passage to adjust a flow of the cooling water, and a controlling part controlling the first fluid passage to the third fluid passage to be selectively opened or closed by operating the fluid flow adjusting valve depending on the temperature of the cooling water, in a heating mode and a non-heating mode.

9 Claims, 5 Drawing Sheets

(51) Int. Cl.
　　　*F02M 26/00*　　　(2016.01)
　　　*B60H 1/03*　　　(2006.01)

(56) References Cited

U.S. PATENT DOCUMENTS

| | | | | |
|---|---|---|---|---|
| 2013/0020398 A1* | 1/2013 | Goto | ............... | B60H 1/00285 237/12.4 |
| 2013/0313031 A1* | 11/2013 | Porras | ............... | F01N 9/00 180/65.21 |
| 2014/0103128 A1* | 4/2014 | Patel | ............... | B60H 1/00885 237/5 |
| 2015/0243866 A1* | 8/2015 | Iriyama | ............... | F01N 5/025 60/320 |

FOREIGN PATENT DOCUMENTS

| | | | | |
|---|---|---|---|---|
| KR | 10-2011-0062138 A | | 6/2011 | |
| KR | 20110062138 A | * | 6/2011 | ............... F01N 5/02 |

* cited by examiner

FIG. 6

| CONTROL REFERENCE MEASURED TEMPERATURE OF COOLING WATER | UPON NOT REQUIRING HEATING (FUEL EFFICIENCY MODE) | | UPON REQUIRING HEAT (HEATING MODE) | |
|---|---|---|---|---|
| | FLUID FLOW ADJUSTING VALVE | FLIP OF EXHAUST HEAT RECOVERY APPARATUS | FLUID FLOW ADJUSTING VALVE | FLIP OF EXHAUST HEAT RECOVERY APPARATUS |
| TEMPERATURE OF COOLING WATER ≤ 60°C | CLOSE FIRST AND SECOND FLUID PASSAGES AND OPEN THIRD FLUID PASSAGE | OPEN HEAT EXCHANGER | OPEN FIRST AND THIRD FLUID PASSAGES AND CLOSE SECOND FLUID PASSAGE (BYPASS EGR GAS) | OPEN HEAT EXCHANGER |
| 60°C < TEMPERATURE OF COOLING WATER ≤ 90°C | OPEN SOME OF FIRST AND THIRD FLUID PASSAGES AND CLOSE SECOND FLUID PASSAGE (INTRODUCE EGR GAS) | OPEN HEAT EXCHANGER | OPEN FIRST AND THIRD FLUID PASSAGES AND CLOSE SECOND FLUID PASSAGE (INTRODUCE EGR GAS) | OPEN HEAT EXCHANGER |
| 90°C < TEMPERATURE OF COOLING WATER ≤ 105°C | OPEN FIRST FLUID PASSAGE, ADJUST OPENING AMOUNT OF SECOND FLUID PASSAGE BY REFLECTING DRIVING SITUATION, AND CLOSE THIRD FLUID PASSAGE | CLOSE HEAT EXCHANGER | OPEN FIRST FLUID PASSAGE, ADJUST OPENING AMOUNT OF SECOND FLUID PASSAGE BY REFLECTING DRIVING SITUATION, AND CLOSE THIRD FLUID PASSAGE | CLOSE HEAT EXCHANGER |
| 105°C < TEMPERATURE OF COOLING WATER | PARTIALLY OPEN FIRST FLUID PASSAGE, MAXIMALLY OPEN SECOND FLUID PASSAGE, AND CLOSE THIRD FLUID PASSAGE | CLOSE HEAT EXCHANGER | PARTIALLY OPEN FIRST FLUID PASSAGE, MAXIMALLY OPEN SECOND FLUID PASSAGE, AND CLOSE THIRD FLUID PASSAGE | CLOSE HEAT EXCHANGER |

COOLING SYSTEM FOR VEHICLE AND CONTROLLING METHOD THEREOF

CROSS REFERENCE TO RELATED APPLICATION

The present application claims priority to Korean Patent Application No. 10-2014-0124769, filed Sep. 19, 2014, the entire contents of which is incorporated herein for all purposes by this reference.

BACKGROUND OF THE INVENTION

Field of the Invention

The present invention relates to a cooling system for a vehicle, and more particularly, to a cooling system for a vehicle capable of rapidly warming-up an engine upon performing a cold start-up using an exhaust heat recovery apparatus, improving fuel efficiency by upwardly controlling a temperature of a cooling water within an endurance limit of the engine depending on a driving condition of the vehicle, and improving durability of the engine, and a controlling method thereof.

Description of Related Art

Due to a global carbon dioxide ($CO_2$) regulation and fuel efficiency regulation, fuel efficiency improvement and an environment-friendly feature have been the core issues in developing a vehicle. Advanced vehicle makers have been concentrated on development of technologies for decreasing fuel to accomplish the above-mentioned objects.

In a cold start-up condition upon initially starting the vehicle, an engine has bad fuel efficiency as compared to a condition in which it is sufficiently warmed-up. The reason is that the engine has high friction due to oil having high viscosity in a state in which a temperature of oil is low upon performing cold starting-up, and a wall surface of a cylinder has a low temperature, resulting in large heat loss into the wall surface and degraded combustion stability.

Therefore, to improve fuel efficiency of the vehicle and improve durability of the engine, it is required to rapidly increase the temperature of the engine to a normal temperature at a time of an initial start.

FIG. 1 schematically shows a cooling system according to the related art, wherein a water pump is mounted in an engine entrance in a cooling water exit controlling scheme. A portion of the cooling water which is introduced into the engine through the water pump flows to an oil cooler (also flows to LP-EGR cooler when using LP-EGR) and passes through a block and a head.

During a closing time of a thermostat (from before warm-up to less than 88° C.), the cooling water flows from a front end of the thermostat to the Exhaust Gas Recirculation (EGR) cooler and a heater cooler. In addition, after opening the thermostat (after warming-up, from 88° C. or more), the temperature of cooling water of the entire system is controlled to be cooled while the cooling water flows to a radiator.

However, according to the above-mentioned cooling flow passage configuration, since the cooling water flows in all fluid passages except for the radiator before the warming-up, heat generated from the engine is dispersed, thereby causing interruption for a rapid increase in the temperature of the engine, and about 30% of energy generated during a combustion process may be lost through exhaust gas.

In addition, since the thermostat (of a wax type) is opened or closed only in a physically set temperature range, it has no choice but to control the temperature of the entire cooling system at a predetermined temperature regardless of a driving condition and it is difficult to manage heat loss and engine friction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling system for a vehicle capable of rapidly warming-up an engine upon performing a cold start-up using an exhaust heat recovery apparatus, improving fuel efficiency by upwardly controlling a temperature of a cooling water within an endurance limit of the engine depending on a driving condition of the vehicle, and improving durability of the engine, and a controlling method thereof.

In an aspect of the present invention, a cooling system for a vehicle may include a cooling water temperature sensor measuring a temperature of a cooling water exhausted from an engine, a cooling circulation fluid passage including a first fluid passage, a second fluid passage, and a third fluid passage, wherein the cooling water exhausted from the engine is branched into the first fluid passage provided with a heater core, the second fluid passage provided with a radiator, and the third fluid passage provided with an exhaust heat recovery apparatus, and is circularly introduced into the engine, a fluid flow adjusting valve provided on a point at which the cooling water passing through the cooling water temperature sensor is branched into the first fluid passage to the third fluid passage to adjust a flow of the cooling water, and a controlling part controlling the first fluid passage to the third fluid passage to be selectively opened or closed by operating the fluid flow adjusting valve depending on the temperature of the cooling water, in a heating mode and a non-heating mode.

The cooling water temperature sensor is provided between the engine and the fluid flow adjusting valve.

The first fluid passage may have an Exhaust Gas Recirculation (EGR) cooler provided thereon.

The exhaust heat recovery apparatus may include an exhaust pipe having exhaust gas flowing therein, a heat exchanger having both ends connected to the exhaust pipe, bypassing the exhaust pipe, and having the third fluid passage penetrating therethrough to perform heat exchange between the water cooling flowing along the third fluid passage and the exhaust gas, and a flip selectively performing an opening or closing operation of the exhaust pipe or the heat exchanger.

In another aspect of the present invention, a controlling method of the cooling system for the vehicle, may include a receiving operation of receiving the temperature of the cooling water exhausted from the engine, and a controlling operation of controlling the first fluid passage provided with the heater core, the second fluid passage provided with the radiator, and the third fluid passage provided with the exhaust heat recovery apparatus to be selectively opened or closed by operating the fluid flow adjusting valve depending on the temperature of the cooling water, in the non-heating mode and the heating mode.

In the controlling operation, when the temperature of the cooling water is less than a first reference value in the non-heating mode, the third fluid passage is controlled to be opened and the first fluid passage and the second fluid passage are controlled to be closed.

In the controlling operation, when the temperature of the cooling water is a first reference value or more and is less than a second reference value in the non-heating mode, a portion of the first fluid passage and the third fluid passage are controlled to be opened and the second fluid passage is controlled to be closed.

In the controlling operation, when the temperature of the cooling water is less than a first reference value in the heating mode, the first fluid passage and the third fluid passage are controlled to be opened and the second fluid passage is controlled to be closed.

In the controlling operation, EGR gas is controlled to be bypassed to an EGR cooler provided on the first fluid passage.

In the controlling operation, when the temperature of the cooling water is a first reference value or more and is less than a second reference value in the heating mode, that the first fluid passage and the third fluid passage are controlled to be opened and the second fluid passage is controlled to be closed.

In the controlling operation, EGR gas is controlled to be introduced to an EGR cooler provided on the first fluid passage.

In the controlling operation, when the temperature of the cooling water is a second reference value or more and is less than a third reference value in the non-heating mode and the heating mode, the third fluid passage is controlled to be closed, the first fluid passage is controlled to be opened, and the second fluid passage is controlled to be opened while adjusting an opening amount depending on an output value reflecting a driving state of the vehicle.

The output value is revolution per minute (RPM) and load of the engine.

In the controlling operation, when the temperature of the cooling water is a third reference value or more in the non-heating mode and the heating mode, the third fluid passage is controlled to be closed, the first fluid passage is controlled to be partially opened, and the second fluid passage is controlled to be maximally opened.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a table which summarizes and illustrates control strategies of the fluid flow adjusting valve and a flip for each temperature of a cooling water according to the controlling method of the cooling system for the vehicle according to the exemplary embodiment of the present invention.

Figure 1:
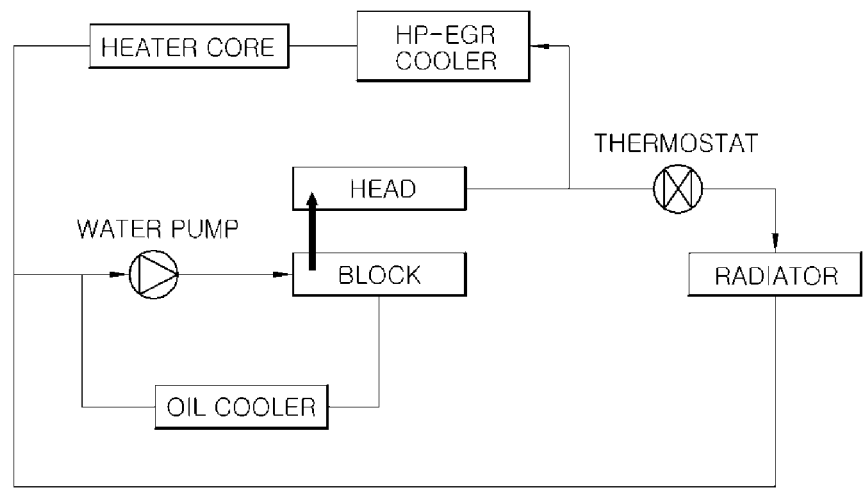
FIG. 1 is a view schematically illustrating a cooling system for a vehicle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings.

A cooling system for a vehicle according to an exemplary embodiment of the present invention is configured to mainly include a cooling water temperature sensor 5, a heater core 9, an EGR cooler 11, a radiator 13, an exhaust heat recovery apparatus 15, a fluid flow adjusting valve 7, and a controlling part.

Figure 2:
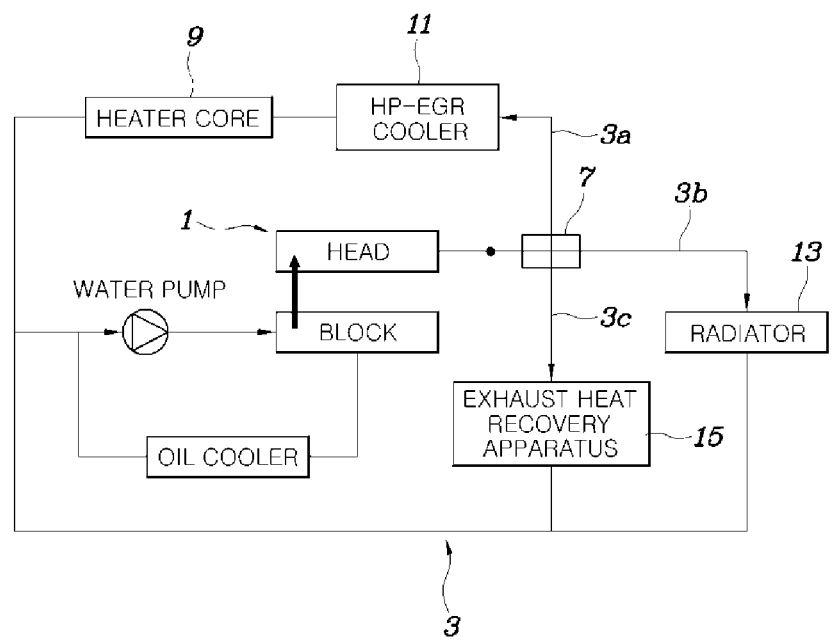
FIG. 2 is a view schematically illustrating a cooling system for a vehicle according to an exemplary embodiment of the present invention.

The present invention will be described in detail with reference to FIG. 2. First, the cooling water temperature sensor 5, which is to measure a temperature of a cooling water, may be, for example, installed at a rear end of an engine 1 on a cooling circulation fluid passage 3 for being configured to measure the temperature of the cooling water which is discharged from the engine 1.

For example, the cooling water temperature sensor 5 may be installed between the engine 1 and the fluid flow adjusting valve 7 to measure the temperature of the cooling water which is heat-exchanged with the engine 1.

In addition, the cooling circulation fluid passage 3 in which the cooling water is circulated may have the heater core 9, the EGR cooler 11, the radiator 13, and the exhaust heat recovery apparatus 15 which are provided in parallel thereon.

For example, the cooling circulation fluid passage 3 may include a first fluid passage 3a, a second fluid passage 3b, and a third fluid passage 3c, and the fluid flow adjusting valve 7 may be installed on a point at which the cooling water discharged from the engine 1 is branched into the first fluid passage 3a, the second fluid passage 3b, and the third fluid passage 3c.

That is, the first fluid passage 3a is provided with the heater core 9 and the EGR cooler 11, and the second fluid passage 3b is provided with the radiator 13, and the third fluid passage 3c is provided with the exhaust heat recovery apparatus 15, such that it is possible to selectively flow the cooling water into the first fluid passage 3a, the second fluid passage 3b, and the third fluid passage 3c by operating the fluid flow adjusting valve 7.

In addition, the controlling part may control the first fluid passage 3a to the third fluid passage 3c to be selectively opened or closed by operating the fluid flow adjusting valve 7 depending on the temperature of the cooling water in a heating mode and a non-heating mode.

Figure 4:
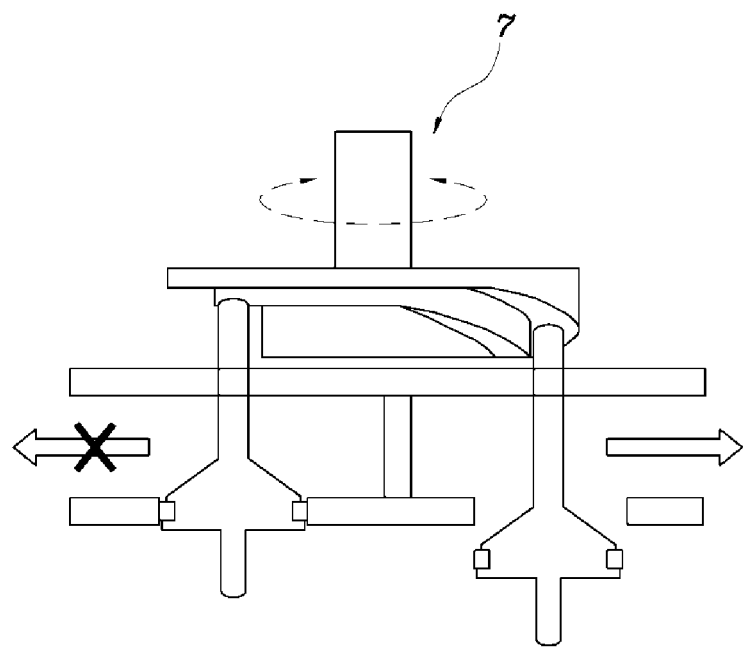
FIG. 4 is a view illustrating a fluid flow adjusting valve which may be applied to the cooling system for the vehicle according to the exemplary embodiment of the present invention.

Here, as an example of the fluid flow adjusting valve 7, a valve of multi-track lift type may be used as shown in FIG. 4. The above-mentioned valve may be a value having a configuration in which a lift amount of a plurality of valves is controlled depending on a plurality of preset track profiles while a motor is rotated. However, a configuration of the fluid flow adjusting valve 7 according to an exemplary embodiment of the present invention is not limited to the configuration of the valve shown in FIG. 4. For example, the valve capable of selectively providing and adjusting a fluid flow of the cooling water to the respective fluid passages may be used.

In addition, the exhaust heat recovery apparatus 15 according to an exemplary embodiment of the present invention, which is to rapidly increase the temperature of the cooling water by a heat exchange of exhaust gas and the cooling water, may be configured to include an exhaust pipe 17, a heat exchanger 19, and a flip 21.

Figure 3:
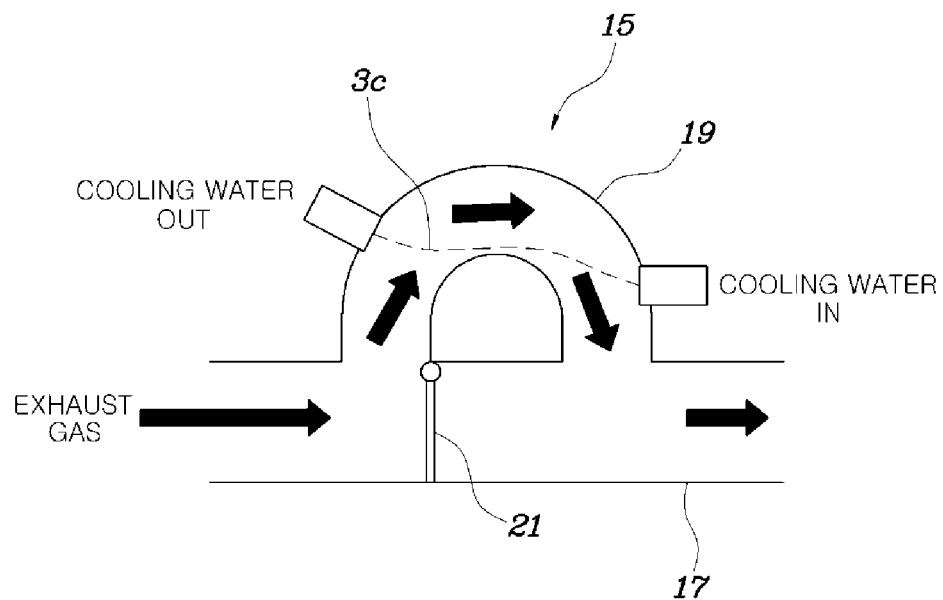
FIG. 3 is a view schematically illustrating a configuration of an exhaust heat recovery apparatus provide in the cooling system for the vehicle according to the exemplary embodiment of the present invention.

For example, referring to FIG. 3, the exhaust gas flows in the exhaust pipe 17, and both ends of the heat exchanger 19 are connected to the exhaust pipe 17, thereby forming a path bypassing the exhaust pipe 17. In addition, the third fluid passage 3c penetrates through the heat exchanger 19, such that the cooling water flowing along the third fluid passage 3c may exchange heat with the exhaust gas flowing along the heat exchanger 19.

In addition, the flip 21 may be rotatably installed at a boundary point between the exhaust pipe 17 and the heat exchanger 19 to selectively open or close the exhaust pipe 17 or the heat exchanger 19.

That is, in the state in which the exhaust pipe 17 is closed by the flip 21, exhaust heat is recovered by the heat exchange with the cooling water by the exhaust gas passing through the heat exchanger 19, and in the state in which the heat exchanger 19 is closed by the flip 21, the exhaust gas escapes through an original path of the exhaust pipe 17.

Meanwhile, a controlling method of the cooling system for the vehicle according to an exemplary embodiment of the present invention described above includes a receiving operation (S10) and a controlling operation (S20).

Figure 5A:
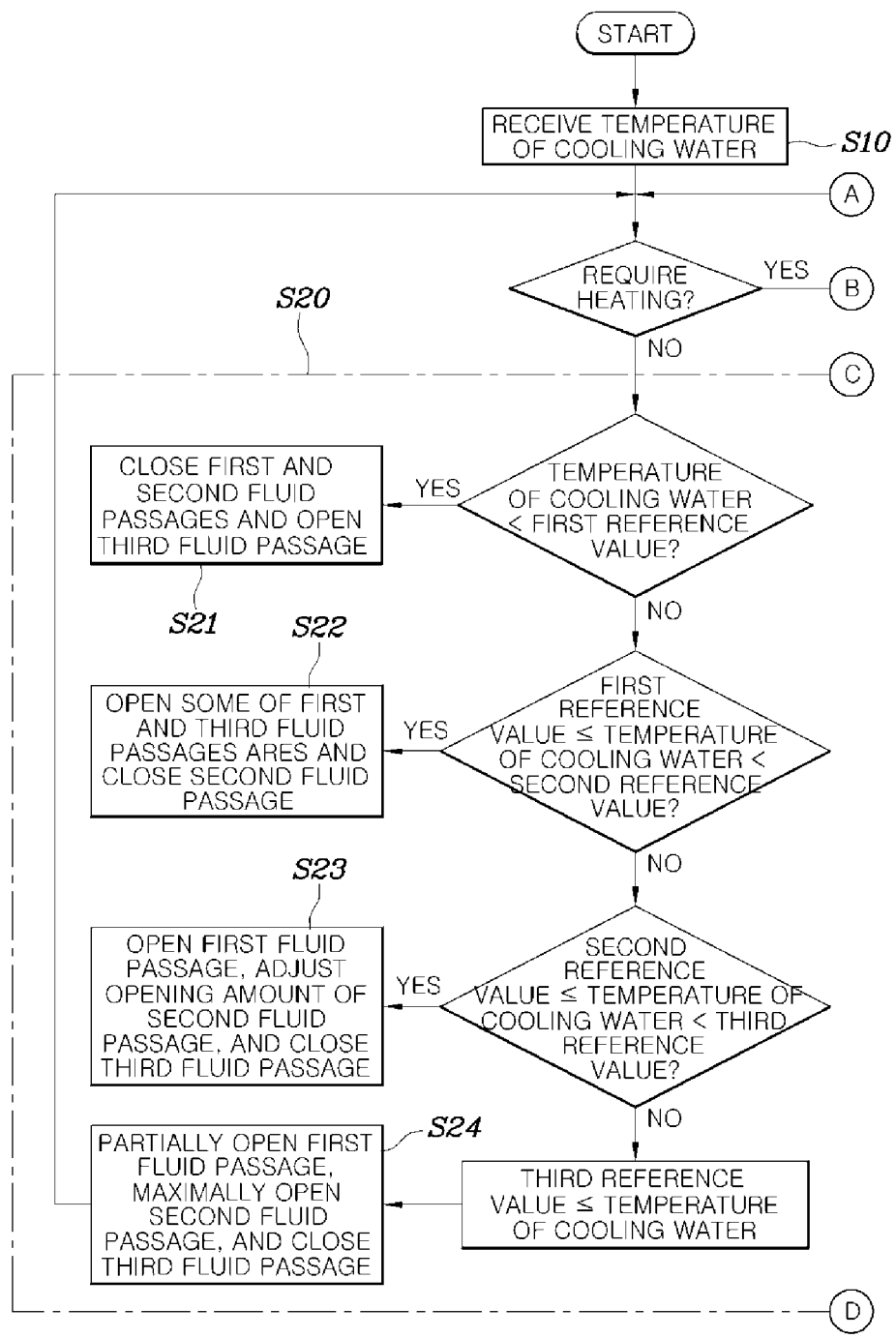
FIG. 5A and FIG. 5B are flow charts for describing a control flow of a controlling method of a cooling system for a vehicle according to an exemplary embodiment of the present invention.
Figure 5B:
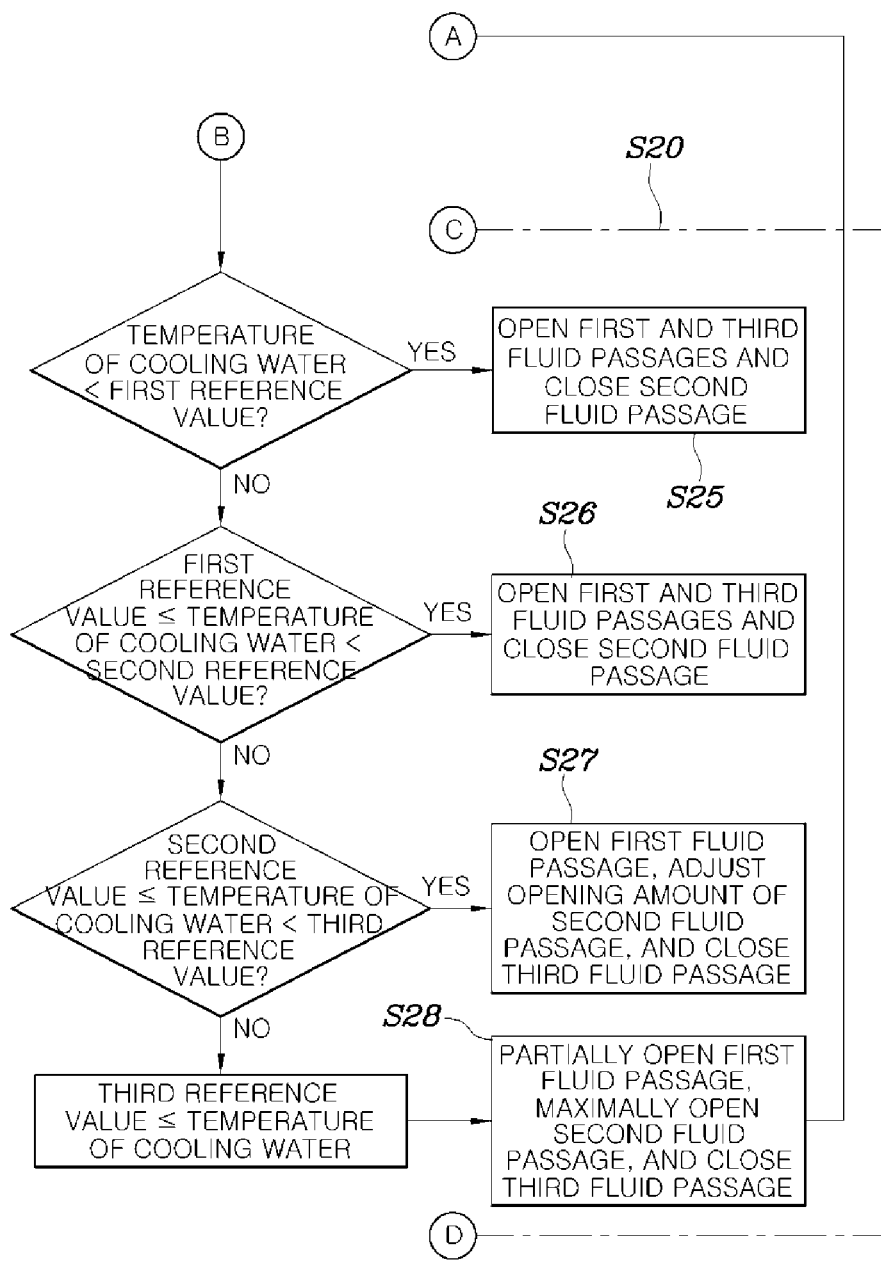

Referring to FIGS. 5A, 5B, and 6, first, in the receiving operation (S10), a temperature of the cooling water discharged from the engine 1 is received.

Particularly, in the controlling operation (S20), a control is performed so that the first fluid passage 3a of the heater core 9 and the EGR cooler 11 side, the second fluid passage 3b of the radiator 13 side, and the third fluid passage 3c of the exhaust heat recovery apparatus 15 side are selectively opened or closed by operating the fluid flow adjusting valve 7 depending on the temperature of the cooling water in the non-heating mode and the heating mode.

That is, by classifying the heating mode and the non-heating mode, and controlling the first fluid passage 3a, the second fluid passage 3b, and the third fluid passage 3c to be selectively opened or closed depending on the temperature of the cooling water exhausted from the engine for each mode, the engine 1 is rapidly warmed-up by the exhaust heat recovery at a time of the cold start-up and the temperature of the cooling water is upwardly controlled within an endurance limit of the engine 1 after the warming-up. Therefore, durability of the engine 1 may be increased, and fuel efficiency may be improved.

In addition, convenience of a passenger may be increased by rapidly increasing the temperature of the heater core 9 when the heating by the heater is required.

A strategy of controlling each temperature of the cooling water by the classification of the non-heating mode and the heating mode in the controlling operation (S20) will be described in detail with reference to the accompanying drawings.

Here, the heating mode refers to a driving situation in which a heating using the heater core 9 is preferentially required, and the non-heating mode refers to a driving situation in which the heating is not required or the fuel efficiency is preferred.

First, a control configuration at a time of the non-heating mode will be described.

In the non-heating mode, when the temperature of the cooling water is less than a first reference value (e.g., 60° C.), a control may be performed so that the third fluid passage 3c is opened and the first fluid passage 3a and the second fluid passage 3b are closed (S21).

That is, a control is performed so that the cooling water is circulated only through the third fluid passage 3c provided with the exhaust heat recovery apparatus 15 to promote a fast increase in temperature by maintaining heat generated by the engine 1 at an initial start (a cold start-up state of the engine 1) in the fluid passage having a route as short as possible and supplying the heat recovered from the exhaust heat recovery apparatus 15 to the engine 1.

In addition, in the above-mentioned non-heating mode, when the temperature of the cooling water is the first reference value or more and is less than a second reference value (e.g., 90° C.), a control may be performed so that some of the first fluid passage 3a and the third fluid passage 3c are opened, and the second fluid passage 3b is closed (S22).

That is, when the temperature sensed by the cooling water temperature sensor 5 is increased to the first reference value or more, since the control is performed so that EGR gas is introduced into the EGR cooler 11, a control is performed so that the first fluid passage 3a provided with the EGR cooler 11 is activated.

In addition, in the above-mentioned non-heating mode, when the temperature of the cooling water is the second reference value or more and is less than a third reference value (e.g., 105° C.), a control may be performed so that the third fluid passage 3c is closed, the first fluid passage 3a is opened, and the second fluid passage 3b is opened while adjusting an opening amount depending on an output value reflecting a driving state of the vehicle (S23).

Here, the output value may be revolution per minute (RPM) and load of the engine, wherein the load may use an amount of used fuel in the case of a diesel engine.

That is, after the engine 1 is sufficiently warmed-up, the third fluid passage 3c provided with the exhaust heat recovery apparatus 15 is closed and the temperature of the cooling water is controlled by adjusting a flow amount of cooling water into the second fluid passage 3b provided with the radiator 13 depending on an output value (the RPM of the engine, the load of the engine, or the like). Therefore, compared to an existing case, the temperature of the cooling water is upwardly controlled within the endurance limit of the engine 1, such that friction and heat loss is reduced, thereby improving fuel efficiency by improving combustion efficiency.

In addition, in the above-mentioned non-heating mode, when the temperature of the cooling water is the third reference value or more, a control may be performed so that the third fluid passage 3c is closed, the first fluid passage 3a is partially opened, and the second fluid passage 3b is maximally opened (S24).

That is, when maximum cooling performance is required at high RPM and high load conditions of the vehicle, since the vehicle enters a region in which the EGR is not used, a flow amount of cooling water of the first fluid passage 3a introduced into the EGR cooler 11 side is reduced and a flow amount of cooling water of the second fluid passage 3b introduced into the radiator 13 side is maximized, thereby maximally implementing the required cooling performance.

Next, a control configuration at a time of the heating mode will be described.

In the heating mode, when the temperature of the cooling water is less than the first reference value (e.g., 60° C.), a control may be performed so that the third fluid passage 3c is opened, and the first fluid passage 3a and the second fluid passage 3b are closed (S25).

That is, the temperature of the cooling water flowing into the heater core 9 is rapidly increased by opening the first fluid passage 3a and the third fluid passage 3c provided with the exhaust heat recovery apparatus 15, the EGR cooler 11, and the heater core 9 at the initial start (the cold start-up state of the engine 1) to thereby use heat energy obtained from the exhaust gas, such that initial heater performance is maximized, thereby increasing convenience of the passenger in the winter.

In addition, in the case of the diesel engine, since the combustion temperature is low, an initial warm-up is significantly slower than that of a gasoline engine and an apparatus such as a PTC heater is additionally installed to rapidly increase a heater temperature according to the related art. However, since the heater temperature is rapidly increased by using the exhaust heat recovery apparatus 15 according to an exemplary embodiment of the present invention, the additional installation of the apparatus such as the PTC heater is not necessary, thereby reducing production cost.

In this case, a control is performed so that the EGR gas is bypassed while not passing through the EGR cooler and is directly entered into the engine 1, thereby aiding combustion stability.

In addition, in the above-mentioned heating mode, when the temperature of the cooling water is the first reference value or more and is less than a second reference value (e.g., 90° C.), a control may be performed so that the first fluid passage 3a and the third fluid passage 3c are opened, and the second fluid passage 3b is closed (S26).

That is, when the temperature sensed by the cooling water temperature sensor 5 is increased to the first reference value or more, since the control is performed so that EGR gas is introduced into the EGR cooler 11, a control is performed so that the first fluid passage 3a provided with the EGR cooler 11 is activated.

In addition, in the above-mentioned heating mode, when the temperature of the cooling water is the second reference value or more and is less than a third reference value (e.g., 105° C.), a control may be performed so that the third fluid passage 3c is closed, the first fluid passage 3a is opened, and the second fluid passage 3b is opened while adjusting an opening amount depending on an output value reflecting a driving state of the vehicle (S27).

Here, the output value may be revolution per minute (RPM) of load of the engine, wherein the load may use an amount of used fuel in the case of a diesel engine.

That is, after the engine 1 is sufficiently warmed-up, the third fluid passage 3c provided with the exhaust heat recovery apparatus 15 is closed and the temperature of the cooling water is controlled by adjusting a flow amount of cooling water into the second fluid passage 3b provided with the radiator 13 depending on an output value (the RPM of the engine, the load of the engine, or the like). Therefore, compared to an existing case, the temperature of the cooling water is upwardly controlled within the endurance limit of the engine 1, such that friction and heat loss is reduced, thereby improving fuel efficiency by improving combustion efficiency.

In addition, in the above-mentioned heating mode, when the temperature of the cooling water is the third reference value or more, a control may be performed so that the third fluid passage 3c is closed, the first fluid passage 3a is partially opened, and the second fluid passage 3b is maximally opened (S28).

That is, when maximum cooling performance is required at high RPM and high load conditions of the vehicle, since the vehicle enters a region in which the EGR is not used, a flow amount of cooling water of the first fluid passage 3a introduced into the EGR cooler 11 side is reduced and a flow amount of cooling water of the second fluid passage 3b introduced into the radiator 13 side is maximized, thereby maximally implementing the required cooling performance.

According to the exemplary embodiment of the present invention, the heating mode and the non-heating mode are classified depending on the temperature of the cooling water reflecting the driving state of the vehicle, and the first fluid passage, the second fluid passage, and the third fluid passage are controlled to be selectively opened or closed, whereby the engine may be rapidly warmed-up by the exhaust heat recovery at a time of performing the cold start-up, the temperature of the cooling water may be upwardly controlled within the endurance limit of the engine after the warming-up, durability of the engine may be improved, and the fuel efficiency may be improved. In addition, convenience of the passenger may be increased by rapidly increasing the temperature of the heater core when the heating by the heater is required.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A controlling method of a cooling system for a vehicle, the controlling method comprising:
   a receiving operation of receiving a temperature of a cooling water exhausted from an engine; and
   a controlling operation of controlling a first fluid passage provided with a heater core, a second fluid passage provided with a radiator, and a third fluid passage provided with an exhaust heat recovery apparatus to be selectively opened or closed by operating a fluid flow adjusting valve depending on the temperature of the cooling water, in an non-heating mode and a heating mode, the heating mode being a driving situation in which a heating using the heater core is required, and the non-heating mode being a driving situation in which the heating is not required or a fuel efficiency is preferred, wherein in the controlling operation, when the temperature of the cooling water is less than a first reference value in the non-heating mode, the third fluid passage is controlled to be opened and the first fluid passage and the second fluid passage are controlled to be closed, and wherein the cooling system includes:
- a cooling water temperature sensor measuring the temperature of the cooling water exhausted from the engine;
- a cooling circulation fluid passage including the first fluid passage, the second fluid passage, and the third fluid passage, wherein the cooling water exhausted from the engine is branched into the first fluid passage provided with the heater core, the second fluid passage provided with the radiator, and the third fluid passage provided with the exhaust heat recovery apparatus, and is circularly introduced into the engine;
- the fluid flow adjusting valve provided on a point at which the cooling water passing through the cooling water temperature sensor is branched into the first fluid passage to the third fluid passage to adjust a flow of the cooling water; and
- a controlling part controlling the first fluid passage to the third fluid passage to be selectively opened or closed by operating the fluid flow adjusting valve depending on the temperature of the cooling water, in the heating mode and the non-heating mode.

2. The controlling method of claim 1, wherein in the controlling operation, when the temperature of the cooling water is a first reference value or more and is less than a second reference value in the non-heating mode, a portion of the first fluid passage and the third fluid passage are controlled to be opened and the second fluid passage is controlled to be closed.

3. The controlling method of claim 1, wherein in the controlling operation, when the temperature of the cooling water is less than a first reference value in the heating mode, the first fluid passage and the third fluid passage are controlled to be opened and the second fluid passage is controlled to be closed.

4. The controlling method of claim 3, wherein in the controlling operation, EGR gas is controlled to be bypassed to an EGR cooler provided on the first fluid passage.

5. The controlling method of claim 1, wherein in the controlling operation, when the temperature of the cooling water is a first reference value or more and is less than a second reference value in the heating mode, that the first fluid passage and the third fluid passage are controlled to be opened and the second fluid passage is controlled to be closed.

6. The controlling method of claim 5, wherein in the controlling operation, EGR gas is controlled to be introduced to an EGR cooler provided on the first fluid passage.

7. The controlling method of claim 1, wherein in the controlling operation, when the temperature of the cooling water is a second reference value or more and is less than a third reference value in the non-heating mode and the heating mode, the third fluid passage is controlled to be closed, the first fluid passage is controlled to be opened, and the second fluid passage is controlled to be opened while adjusting an opening amount depending on an output value reflecting a driving state of the vehicle.

8. The controlling method of claim 7, wherein the output value is revolution per minute (RPM) or load of the engine.

9. The controlling method of claim 1, wherein in the controlling operation, when the temperature of the cooling water is a third reference value or more in the non-heating mode and the heating mode, the third fluid passage is controlled to be closed, the first fluid passage is controlled to be partially opened, and the second fluid passage is controlled to be maximally opened.

* * * * *